Figure 1:
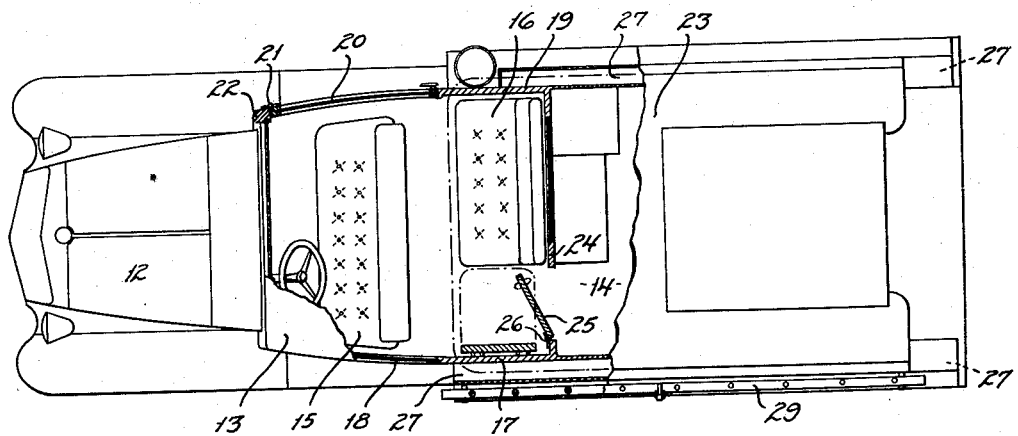

June 14, 1938.　　　　N. P. LARSEN　　　　2,120,918

VEHICLE BODY CONSTRUCTION

Filed Feb. 18, 1937　　　2 Sheets-Sheet 1

INVENTOR.
NEIL P. LARSEN
BY Bates, Golrick & Teare
ATTORNEYS

June 14, 1938.  N. P. LARSEN  2,120,918
VEHICLE BODY CONSTRUCTION
Filed Feb. 18, 1937    2 Sheets-Sheet 2

INVENTOR.
NEIL P. LARSEN
BY Bates, Golrick, & Teare
ATTORNEYS

Patented June 14, 1938

2,120,918

UNITED STATES PATENT OFFICE 2,120,918

VEHICLE BODY CONSTRUCTION

Neil P. Larsen, Cleveland, Ohio, assignor to American Coach and Body Company, Cleveland, Ohio, a corporation of Ohio Application February 18, 1937, Serial No. 126,448

1 Claim. (Cl. 296—24)

The present invention relates broadly to motor vehicles of the type used by public utility companies, and more particularly to an improvement in body and cab constructions for such vehicles. Organizations, such as public utility companies, require the use of motor vehicles, having storage compartments for long tools, and provisions for carrying lengthy equipment, such as ladders, pike poles, long-handled shovels, and the like.

Heretofore, bodies of public utility company service vehicles were constructed of sufficient length to accommodate such elongated equipment without having any of the equipment projecting beyond the rear end of the vehicle, but the bodies were used in connection with a single seat cab construction.

Such vehicles are, however, now used to provide transportation for workmen, as well as for the transportation and storage of tools and supplies, as pointed out in my United States Patent No. 2,063,313, and this requires the use of larger cab compartments. To meet this increasing demand for larger cabs, and the need for storage compartments capable of accommodating lengthy equipment, without increasing the length of the vehicle chassis, has been successfully solved by the present invention.

From an economical standpoint of operating these vehicles, and from the point of manually handling such vehicles while they are upon the state highways, and for various other reasons, it is desirable not to increase the wheel base of such vehicles.

Another object of the present invention, therefore, is to provide an improved body having a large cab compartment and an adjoining storage compartment, which, in addition to accommodating the necessary lengthy equipment, tools, supplies and a number of workmen, can be readily mounted upon a standard chassis, or a chassis having a comparatively short wheel base, without the hazard of having any of the equipment projecting beyond the rear end of the body.

An additional and more specific object of my invention resides in the location of the partition wall separating the cab compartment from the general storage compartment, with respect to the elongated tool compartments. To increase the size of the cab compartment, and to retain the elongated tool compartments, without increasing the standard chassis length of such truck, I propose to extend the forward portions of said elongated tool compartments forward of said cab partition or rear wall and adjacent a portion of the cab side walls.

A still further object of my improved cab and storage compartment arrangement is to dispense with overhead compartments in the storage compartment, thereby furnishing more headroom for the workmen while operating the equipment which is normally carried within the storage compartment.

Numerous other objects of the present invention will become more apparent from the following description, reference being had to a preferred embodiment of the invention illustrated in the drawings.

My invention consists in the construction, combination, location and arrangement of parts, all of which will hereinafter be more fully described, and finally pointed out in the claim.

Figure 2:
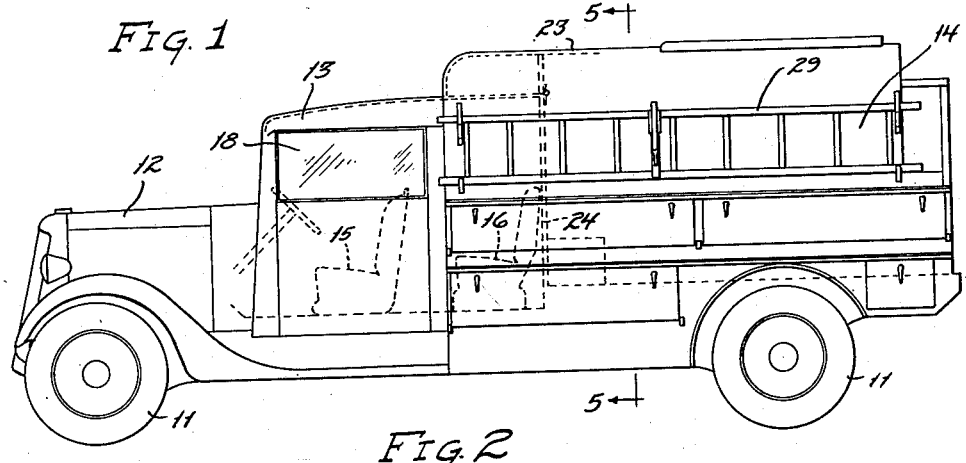
Figure 3:
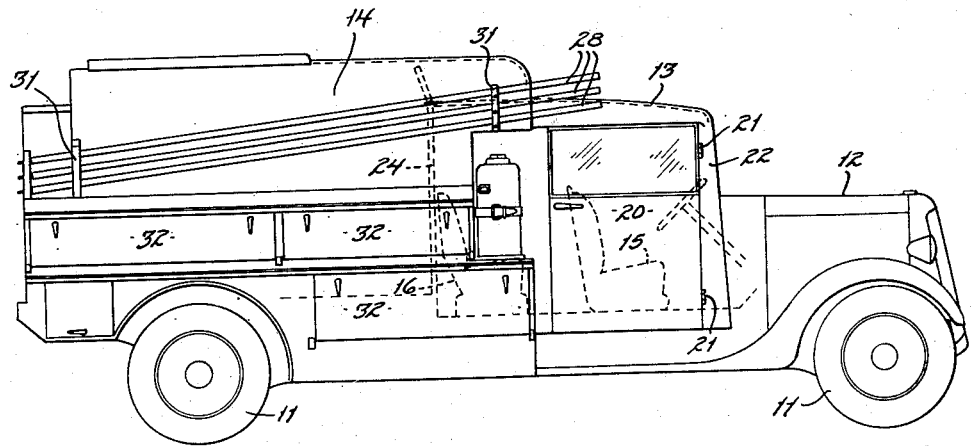
Figure 4:
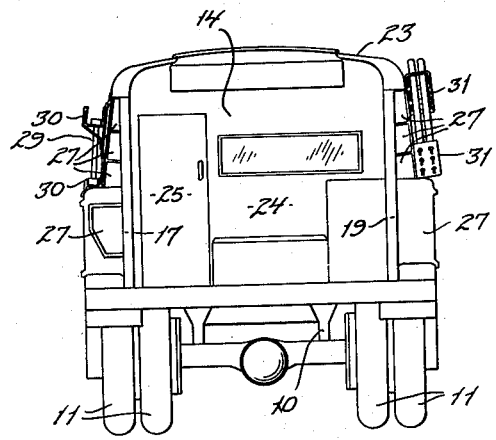

Referring now to the drawings, wherein like reference characters represent corresponding parts throughout the several views, Fig. 1 is a plan view of a motor vehicle, provided with my improved body structure, certain portions of the cab and general storage compartment being broken so as to more clearly illustrate the internal structure thereof; Fig. 2 is a left-hand side elevation of the vehicle illustrated in Fig. 1; Fig. 3 is a right-hand side elevation of the vehicle illustrated in Fig. 1; Fig. 4 is a rear elevation of the vehicle, illustrated in Figs. 1, 2 and 3; and Fig. 5 is a transverse section, the plane of the section being indicated by the lines 5—5 on Fig. 2.

Figure 5:
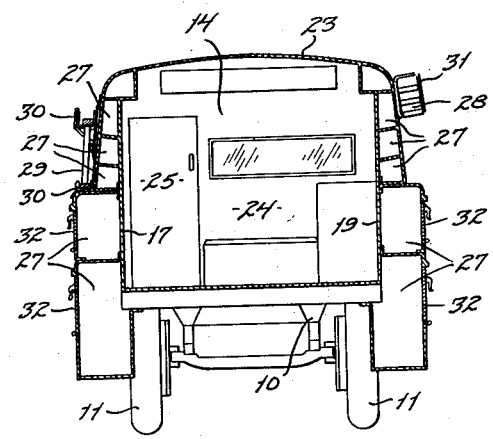

As an embodiment of the present invention, I have illustrated a public utility service truck, having the usual chassis 10, supported by suitable wheels 11, as best shown in Figs. 4 and 5, respectively. The wheel base of this chassis is considerably shorter than the chassis shown in my above-mentioned United States patent, due to the improved compact cab and storage compartment arrangement which forms the principal part of my present invention. The vehicle shown, is driven by the usual motor, not shown, but enclosed by a suitable hood 12, at the forward end of the vehicle. To the rear of the motor unit, or over it, I mount on the chassis 10 a body which comprises a cab compartment 13 and a storage compartment 14. The cab compartment is provided with a pair of seats 15 and 16, one disposed to the rear of the other to accommodate workmen who are being transported from place to place.

By a study of Fig. 1 is will be noted that the left-hand side of cab 13 is closed by a body wall 17, the latter being supplied with the usual window 18 located adjacent the driver's seat 15. It will also be noted that the right-hand side of the cab 13 is closed by a body wall 19, and that the wall 19 is provided with a door 20, hinged preferably at its front end, as at 21, to a suitable vertical cab frame member 22.

This door is located approximately adjacent the driver's seat 15 and permits access to both the seats 15 and 16, respectively.

Storage space for supplies is provided by the compartment 14, located behind the cab 13, and this compartment or closure is formed by the body side walls 17 and 19, and top 23, respectively, as clearly shown in Fig. 5. The front end of the storage compartment is closed by the rear wall 24, of the cab, while the rear of said compartment is open to provide access thereto from the rear of the vehicle.

By a study of Fig. 1, it will be apparent that wall 24 serves as a partition between the cab and storage compartment, and to facilitate the accessibility of tools and supplies to the workmen, I provide a door 25, pivoted as at 26 to a suitable upright vehicle frame member, and adapted to swing outwardly relative to the storage compartment 14 and into the cab 13, so that workmen from either seat 15 or 16 may readily pass between the cab and storage compartment and leave or enter the cab from the rear of the vehicle.

Attention is directed now to Figs. 1 and 5, for an understanding as to how I propose to locate the elongated tool compartments. Generally, these compartments are mounted outside and adjacent the body walls 17 and 19, and in such a manner as not to have any of the tools project beyond the rear end of the truck. As shown in Fig. 5, these elongated tool compartments are designated generally by the reference numeral 27, and are mounted to the outside of the body walls 17 and 19, respectively. In order to utilize a short chassis and a large cab compartment, for reasons heretofore explained, I find it convenient to extend the elongated tool compartment forward of the partition wall 24, and adjacent that portion of the body walls 17 and 19, respectively, which form the rear portion of the cab compartment 13, as best illustrated in Figs. 1, 2 and 3, respectively.

As shown in Fig. 2, the forward ends of some of these elongated tool compartments 27 terminate approximately opposite the forward edge of rear seat 16, so that in effect the rear part of the cab 13 is recessed or telescoped rearwardly, so to speak, between the elongated tool compartments, and due to this construction a very neat and compact arrangement is had.

In this type of truck, it is essential to carry lengthy equipment, such as pike-poles 28 (Fig. 3) and a ladder 29 (Fig. 2). The ladder 29 in the instant case is supported exteriorally of the body by brackets or hangers 30, suitably secured to the elongated compartments 27, as shown in Figs. 2 and 5, and the respective ends of said ladder are confined between the rear end of the vehicle and window 18 of the cab. The usual brackets 31 for the pike-poles 28 are also suitably secured to the outside of certain of the elongated tool compartments 27 on the right-hand side of the truck, and are arranged in such manner that the forward ends of such poles are elevated above the usual window in the cab door 20, as shown in Fig. 3, so as not to interfere with workmen entering or leaving the cab, or obstruct the vision of the driver of said vehicle. Some of the elongated tool compartments are preferably provided with hinged doors 32 to enable workmen to remove tools from, or replace them within the compartments 27, from the outside of the vehicle.

From the foregoing description, it will be noted that I have arranged the necessary elongated tool compartments of public utility service trucks in such fashion, relative to a large cab compartment, that a standard chassis may be utilized, and that I have provided a vehicle body construction which is extremely compact in design and highly practical in use.

I claim:

A vehicle body, comprising a unitary structure having a partition therein dividing it into a closed cab compartment and an open storage compartment, said storage compartment including at least one compartment type side wall characterized by the fact that a portion of said compartment type side wall is disposed forwardly of said partition and extends from the floor to the roof of the storage compartment.

NEIL P. LARSEN.